US011757300B2

(12) United States Patent
Schmidt

(10) Patent No.: US 11,757,300 B2
(45) Date of Patent: Sep. 12, 2023

(54) APPARATUS AND METHOD FOR BATTERY CHARGING AND POWER GENERATION

(71) Applicant: Walter Corporation LLC, Taylorsville, UT (US)

(72) Inventor: Waynard Schmidt, Taylorsville, UT (US)

(73) Assignee: Walter Corporation LLC, Taylorsville, UT (US)

( * ) Notice: Subject to any disclaimer, the term of this patent is extended or adjusted under 35 U.S.C. 154(b) by 0 days.

(21) Appl. No.: 17/557,644

(22) Filed: Dec. 21, 2021

(65) Prior Publication Data
US 2022/0344966 A1    Oct. 27, 2022

Related U.S. Application Data

(63) Continuation of application No. 17/242,206, filed on Apr. 27, 2021, now Pat. No. 11,205,918.

(51) Int. Cl.
*H02J 7/35* (2006.01)
*H02J 7/00* (2006.01)
*H02S 40/38* (2014.01)

(52) U.S. Cl.
CPC .............. *H02J 7/35* (2013.01); *H02J 7/0013* (2013.01); *H02J 7/0042* (2013.01); *H02S 40/38* (2014.12)

(58) Field of Classification Search
CPC ...................................... H02J 7/35; H02J 7/00
See application file for complete search history.

(56) References Cited

U.S. PATENT DOCUMENTS

2019/0267929 A1* 8/2019 Carrington .............. H02S 20/30
2021/0107369 A1* 4/2021 Lojek .................... H02J 7/0029

\* cited by examiner

*Primary Examiner* — Robert Grant
(74) *Attorney, Agent, or Firm* — Bochner PLLC; Andrew D. Bochner

(57) ABSTRACT

Provided is a power-generating apparatus comprising a box having a cavity and a lid, one or more solar panels disposed on the box, and one or more battery packs disposed within the cavity, where the one or more solar panels are configured to charge the one or more battery packs. The apparatus may further comprise a turbine configured to charge the one or more battery packs.

12 Claims, 5 Drawing Sheets

APPARATUS AND METHOD FOR BATTERY CHARGING AND POWER GENERATION

FIELD OF INVENTION

The invention is in the field of batteries, specifically apparatuses and methods that charge batteries while using renewable energy techniques to generate power.

BACKGROUND

There are a number of batteries and backup power solutions available. However, each of these devices, especially those utilizing lithium-ion batteries, suffers from the same problem: most people charge these devices, place them in a closet or a drawer, and are shocked to find that, when they need them, they are completely out of charge. Unfortunately, the nature of lithium-ion batteries is that they need to be charged to capacity and drained completely multiple times. The reality is that it is burdensome and easy to forget to frequently charge a backup power source, especially when there are only a handful of power outages per year.

Moreover, often the times when a user is most likely to use a backup power source are also at times when traditional power is down. Thus, many of the popular backup power solutions are useless once their charge has been drained during a power outage.

It would be desirable to have apparatuses and methods of backup power that utilize renewable sources of power to operate. Further, it would desirable to have backup power apparatuses and methods configured to charge while providing another function.

SUMMARY OF THE INVENTION

The invention may be a power-generating apparatus comprising a box having a cavity and a lid, one or more solar panels disposed on the box, and one or more battery packs disposed within the cavity, where the one or more solar panels are configured to charge the one or more battery packs. The apparatus may further include a turbine configured to charge the one or more battery packs. The box may have a bottom surface, a top surface, a left wall, a right wall, a rear wall, and a front wall. The top surface of the box may include insulation. In an embodiment, the apparatus has an air exhaust and/or one or more fans.

In an embodiment, a heat gauge may be configured to instigate the one or more fans when the cavity reaches a pre-determined temperature. Each of the battery packs may include a power input, a power output, and a charging interface. In an embodiment, the power input is a male wall plug. In on embodiment, The apparatus includes one or more charging ports disposed within the cavity, the one or more charging ports configured to transfer power to the one or more batteries via the charging interface.

DETAILED DESCRIPTION OF THE PREFERRED EMBODIMENT

Figure 1:
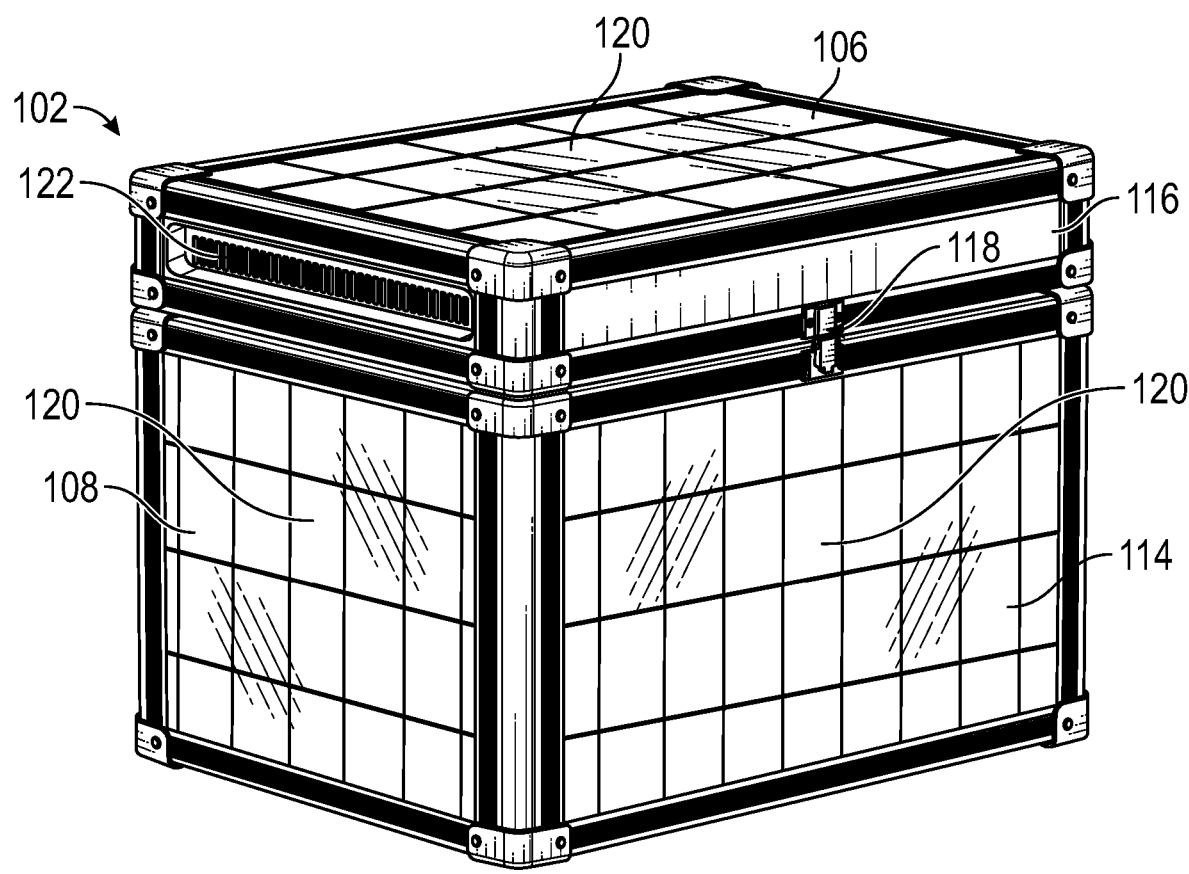
FIG. 1 is a top front left side perspective view of an embodiment of a closed power-generating box.

The present invention adds a whole new dimension to back-up power by combining methods of renewable energy production with dynamic battery packs.

Throughout the specification, wherever practicable, like structures will be identified by like reference numbers. In some figures, components, such as additional electrical connections or fasteners have been omitted for clarity in the drawings. Unless expressly stated otherwise, the term "or" means "either or both" such that "A or B" includes A alone, B alone, and both A and B together.

Referring to FIG. 1, in an embodiment, the invention of the present disclosure includes a box 102. The box 102 may have a bottom surface 104, a top surface 106, a left wall 108, a right wall 110, a rear wall 112, and a front wall 114. In an embodiment, the bottom surface 104, the top surface 106, the left wall 108, the right wall 110, the rear wall 112, and/or the front wall 114 may have a depth. For example, any of these components may be thick, thin, or hollow. In one embodiment, these components are hollow and sufficiently thick to allow for the running of cables or wires.

The box 102 may further have a lid 116. The lid 116 may encompass primarily the top surface 106. However, in alternate embodiments, the lid 116 may be disposed on any portion of the box 102 (for example, the right wall 110). The lid 116 may be attached to the box 102 via one or more hinges 204. In an embodiment, the lid 116 may be lockable via a latch 118. In an embodiment, the lid 116 is configured to slide or retract from the top surface 106 (for example, akin to a sliding desk drawer).

In an embodiment, the hinges 204 have locking positions. As a non-limiting example, the hinges 204 may be configured to lock open once the lid 116 has been opened at a 135 degree angle (or any other suitable angle). In such a non-limiting example, the hinges 204 may only "lock" the lid 116 into such a position temporarily. For example, a user implementing a reasonable amount of force may overcome the locked position of the hinge 204, allowing for the lid 116 to once again close. The hinges 204 may also temporarily "lock" when the lid 116 is in the closed position.

The box 102 may include a cavity 206. In an alternate embodiment, the box 102 may have any number of sides. As a non-limiting example, the box 102 may be a triangular prism with four sides. In another non-limiting example, the box 102 may be a cylindrical prism, having a top surface, a bottom surface, and a continuous sidewall. In an embodiment, the box 102 is watertight and/or airtight. In such an embodiment, the lid 116 may include a gasket or rubber retainer that prohibits fluid from flowing between the lid 116 and the box 102. In another embodiment, the box 102 may be coated with a sealant or water resistant coating.

In an embodiment, one or more solar panels 120 are disposed on each wall and surface of the box 102. In one embodiment, one or more solar panels 120 are disposed on the top surface 106, the left wall 108, the right wall 110, the rear wall 112, and the front wall 114. In an embodiment, the one or more solar panels 120 may be monocrystalline or polycrystalline. However, in an alternate embodiment, the solar panels 120 may be any kind of solar panel. In an embodiment, one or more panes of glass, acrylic, or another transparent material are disposed over the one or more solar panels 120. As a non-limiting example, acrylic is placed over the one or more solar panels 120 to prevent the solar panels 120 from being damaged.

The one or more solar panels 120 may be partially surrounded by a solar panel frame (for example, surrounding the top, bottom, right side, left side, and rear face of the one or more solar panels 120). The solar panel frame may be attached to any of the sides of the box 102. In such an embodiment, a solar panel mount may be disposed between the solar panel frame and the box 102. In a further embodiment, the solar panel mount may be adjustable, enabling the angle between a box wall and the solar panel frame to change. In another embodiment, the solar panel mount is adjustable in multiple directions (for example, the solar panels 120 may be pulled further or pushed closer to the box 102, the solar panels 120 may be turned to the right, left, up, or down). In another embodiment, the solar panel mount may be motorized or otherwise configured to adjust the solar panels 120 incident to the sun (for example, moving the solar panels 120 so that the solar panels 120 are perpendicular to light being emitted by the sun). In such an embodiment, the solar panel mount may be in electrical communication with the box computer.

In an embodiment, the box 102 has an air exhaust 122. The air exhaust 122 may be disposed on the left wall 108 of the lid 116. However, in other embodiments the air exhaust 122 may be disposed any where on the box 102. The air exhaust 122 may be a hole. In one embodiment, the air exhaust hole is rectangular and oblong. However, the air exhaust hole may be any shape. A grille or a grate may traverse the air exhaust hole. As a non-limiting example, the grate may be a series of vertical slats running from the left end of the air exhaust hole to the right end of the air exhaust hole. In one embodiment, the grate is configured to prevent especially large debris or wildlife from entering the cavity 206. The air exhaust 122 may be a number of air exhaust holes disposed along various portions of the box 102. For example, an air exhaust 122 may be disposed on the left wall 108 of the lid 116, the front wall 114 of the lid 116, and the right wall 110 of the lid 116.

Figure 2:
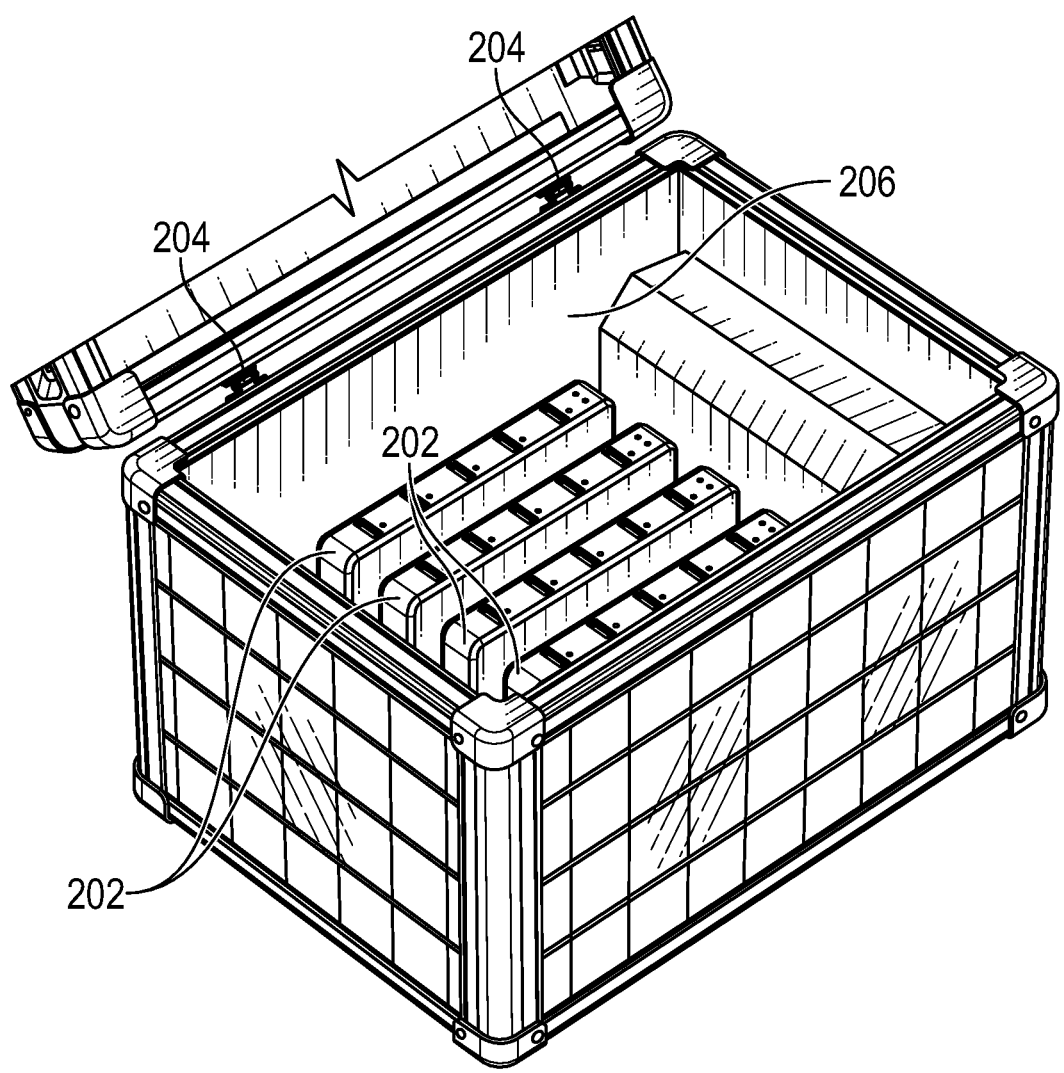
FIG. 2 is a top front left side perspective view of an embodiment of an open power-generating box.

Referring to FIG. 2, in an embodiment, the cavity 206 may house one or more battery packs 202. The cavity 206 may further include one or more charging ports. In an embodiment, the battery packs 202 may slide into a pre-fit housing. In an embodiment, the pre-fit housing includes one or more contacts configured to charge the battery (for example, the lithium ion cells). The contacts may be USB or any other standardized way of connecting batteries to a power source. In an embodiment, the battery pack 202 may have an exposed contact that interfaces with the contact in the pre-fit housing. The pre-fit housing may be a series of indentations in the floor of the box 102 that are sized to accept the bottom surface of the battery packs 202 (for example, allowing a user to lower the battery pack 202 into the indentation such that the battery pack fits snuggly). In another embodiment, the pre-fit housing includes a series of rails that interface with the bottom of the battery packs 202 (for example, a "slide and lock" system).

In an embodiment, the box 102 includes a heat gauge and one or more fans. In such an embodiment, the heat gauge is configured to read the temperature within the cavity 206 and trigger the one or more fans at a pre-determined temperature threshold. As a non-limiting example, when the temperature within the cavity 206 reaches 113 degrees Fahrenheit, the heat gauge triggers the fans, which cool the cavity 206. In a further embodiment, the box 102 includes a heater. The heater may also be in communication with the heat gauge and may be configured to provide heat to the cavity 206 when the cavity 206 drops below a pre-determined temperature threshold. The one or more fans may be disposed within or proximate to the one or more air exhausts 122. The fans may be configured to draw air from the environment into the cavity 206.

The box 102 may include an electronic housing within the cavity 206. In an embodiment, the computing system may be housed in the walls of the box 102. In a further embodiment, the computing system may be proximate to the insulation (for example, to withstand higher and lower temperatures and to maintain a more stable temperature). However, in another embodiment, the electronic housing may have a second dedicated insulation. In one embodiment, the electronic housing is a container disposed within the cavity 206 that may house electronic components of the box 102 (for example, fans, a box computer, or other power connectors). In an embodiment, the electronic housing may not be a separate container, but instead a space resulting from intersections of walls.

In an embodiment, the cavity 206 includes a fan intake. The fan intake may be a grate permeating the electronic housing or an inside wall or walls of the box 102. The fan intake may allow for fluid communication between the inside and outside of the box 102 (for example, allowing for fresh air to be drawn into the cavity 206). One or more fans may be disposed in the fan intake. The fan intake may be configured to facilitate the flow of air into the cavity 206 from the environment. The box 102 may include more than one fan along the walls.

In an embodiment, the box 102 includes a box computing system or computer. In an embodiment, the computer is designed to monitor the temperature of the box 102, the charging levels of the lithium-ion battery packs 202, and to initiate and monitor the fans. The box computer may include a processor and a memory. The box computer may be in electrical communication with the one or more solar panels 120, the one or more battery packs 202, and other electrical components of the apparatus. The box computer may be configured to read the charge levels of the battery packs 202 and the estimated time to full charge.

The computer may be in electrical communication and/or configured to route power to and/or from the heat gauge, the one or more fans, the solar panels 120, the turbine 302, and the battery packs 202. In such an embodiment, the computer and/or processor may direct signals to the various electrical components (for example, to activate or deactivate a component). The computer may include or may be in communication with a power converter, step down converter, or other modules configured to convert, clean, and/or filter signals and/or power.

In an embodiment, the device has a light sensor and/or a wind sensor. The light sensor and/or the wind sensor may be disposed on the outside of the box 102 and may be in electrical communication with the computer. The light sensor and/or wind sensor may also be disposed on an external component (for example, the turbine 302). The wind sensor may be able to determine the direction and speed of the wind. The light sensor may be able to determine the intensity and direction of incident light. The light sensor may be configured to track the apparent movement of the sun through the sky, enabling the solar panels 120 to receive the most direct sunlight. The computer may be configured to receive signals from the light sensor and/or the wind sensor. The light sensor and/or wind sensor may also be configured to analyze dangerous conditions. As a non-limiting example, the wind sensor and the computer may determine if the wind speed approaches velocities that could damage the device. In a further non-limiting example, the light sensor and computer may determine if there is a dangerous presence of light that could damage the one or more solar panels 120 or overload the device. In an embodiment, the turbine 302 may include a brake that stops the wind turbines 302 from spinning if the wind speeds are too great. In such an embodiment, the computer may generate a signal to the brake if the wind sensor provides the computer with information containing dangerously high winds.

In an embodiment, power (for example, power generated by the turbine 302 or solar panels 120) may run through a step down converter, which then may route power to the battery packs 202. The step down converter may accept up to 16V of solar power and 16V of wind power and direct power to the battery packs 202 to charge evenly and effectively. However, in various embodiments, the step down converter may accept a range of voltages from the solar panels 120 and/or turbine 302. In an embodiment, a step down converter or other power converter may be disposed within the turbine 302. In such an embodiment, power may be converted in the turbine 302 before being transmitted to the box 102.

In an embodiment, the box 102 and/or computer include an external power input. In such an embodiment, the external power input is configured to accept power and distribute power to the batteries or other components of the box 102. In an embodiment, the box 102 and/or computer further include an external power output. In such an embodiment, the external power output is configured to distribute power from the box 102 to an external device. The external power output and external power input may enable a plurality of boxes to be linked together. In such an embodiment, power may be distributed throughout the chain of boxes.

Figure 3:
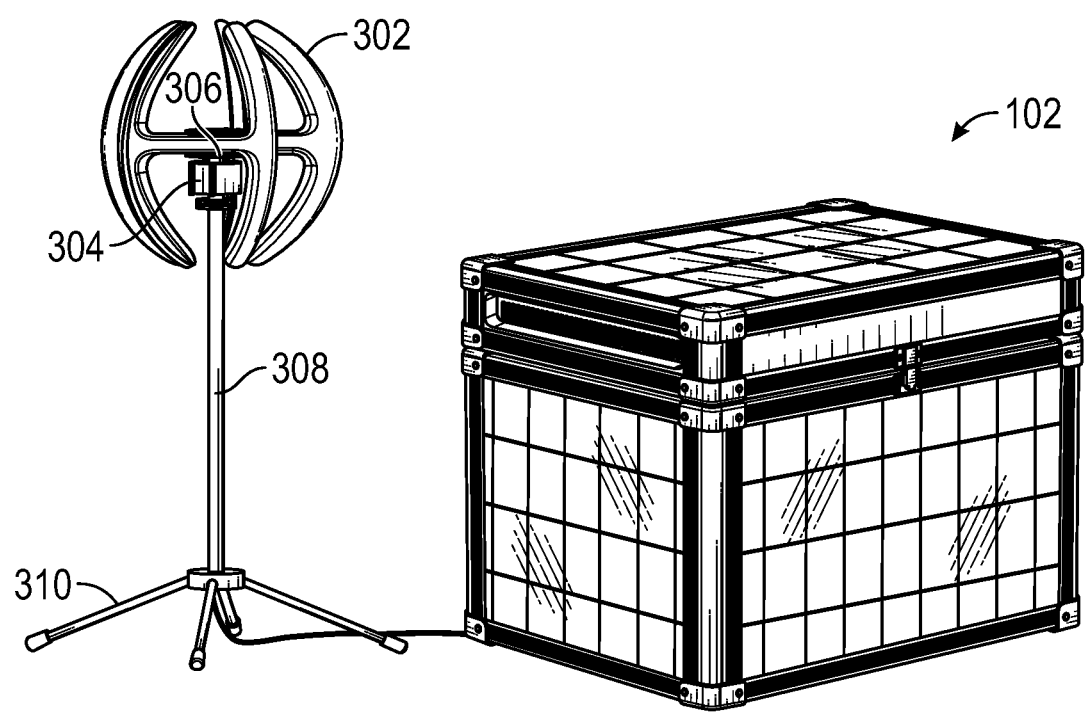
FIG. 3 is a top front left side perspective view of an embodiment of a turbine connected to a power-generating box.

Referring to FIG. 3, the box 102 may be in electrical communication with a wind turbine 302. Each wind turbine 302 may include one or more blades 312. The blades 312 may be attached to a shaft 306. In one embodiment, each wind turbine 302 includes five blades 312. In an embodiment, each blade 312 may have a proximal end and a distal end. The proximal end may be the end of the blade 312 closest to the shaft 306. The distal end of the blade 312 may be curved with flanges at the outer most edge of the distal end of the blade 312. In such an embodiment, the blade 312 may be configured to capture air blowing in either direction. In a further embodiment, the stem connecting the proximal end of the blade 312 to the distal end of the blade 312 may include one or more ridges (for example, configured to better capture air). The one or more wind turbines 302 may be attached to the same shaft 306 or more that one shafts 306. In an embodiment, the shaft 306 may be attached to a stand 310 and/or in communication with a turbine generator. The turbine generator may be configured to convert the rotation of the turbine 302 into electricity. In an embodiment, a turbine power cord runs from the turbine 302 and/or turbine generator to the box 102. In such an embodiment, the turbine power cord may run to the external power input of the box 102.

The turbine 302 may be disposed on a movable stand 310 (for example, a tripod). The legs of the stand 310 may be poseable or foldable. The stem 308 of the stand 310 may be located between the legs and the turbine generator. The stem 308 may be hollow, allowing for wires to run through it. In one embodiment, the stand 310 may allow for the turbine 302 to be tilted on its side or otherwise angled.

In an embodiment, the wind turbine 302 may also function as a hydroelectric turbine. In such an embodiment, the wind turbine 302 may be positioned such that the one or more blades 312 are submerged or partially submerged in moving water. As a non-limiting example, the turbine 302 may be placed such that it is partially submerged in a creek. In another embodiment, a dedicated hydroelectric turbine is in electric communication with the box 102. In such an embodiment, the hydroelectric turbine may be a water wheel. In an embodiment, the turbine 302 is watertight or otherwise waterproof.

Figure 4:
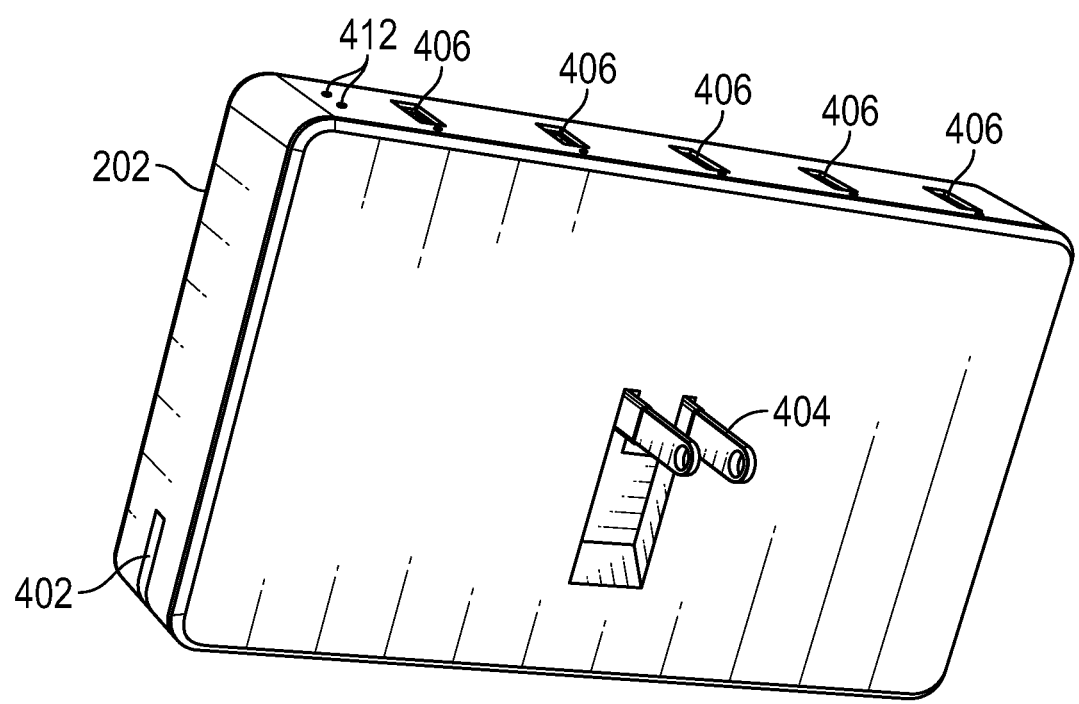
FIG. 4 is a rear perspective view of an embodiment of a battery pack.
Figure 5:
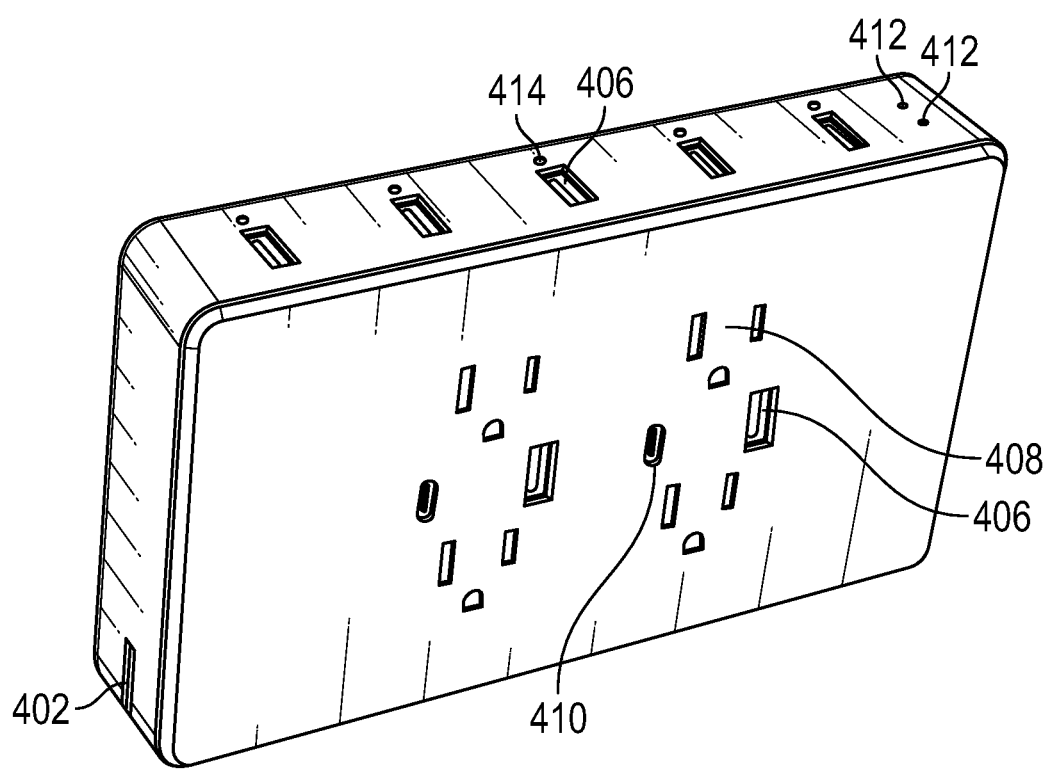
FIG. 5 is a front perspective view of an embodiment of a battery pack.

Referring to FIG. 4 and FIG. 5, the battery pack 202 may have a front face, a rear face, a right side, a left side, a top surface, and a bottom surface. However, in alternate embodiments, the battery pack 202 may have any number of surfaces. The battery pack 202 may include a power input, a power output, and a charging interface 402. The charging interface 402 may be metal contacts that when touched, complete the circuit and charge the battery. The charging interface 402 may also be USB, USCB or any other standard means of charging lithium-ion battery cells. The battery pack 202 may include a battery. The battery may be a lithium-ion battery. However, in alternate embodiments, the battery may be zinc-ion, sodium-ion, or any other type of battery.

The power input 404 may be a standard two or three prong plug. In an embodiment, the power input 404 may be retractable or foldable. As a non-limiting example, the power input 404 may be disposed on the rear face of the battery pack 202. Further, the rear face of the battery pack 202 may have a recess sized to accept the power input 404 when folded or retracted. The power input 404 may be configured to draw power from a standard wall outlet. In an embodiment, the power input 404 may be configured to charge the battery pack 202. In an embodiment, the battery pack 202 may include more that one power inputs 404.

The battery pack 202 may have one or more power outputs. The power outputs may be standard female wall sockets 408, female USB ports 406, female micro-USB ports, female USBC ports 410, or other common power formats. The power outputs may also be male versions of a female port.

In an embodiment, the battery pack 202 includes charging indicators 412. The charging indicators 412 may be a light (for example, an LED). The charging indicator 412 may communicate to the user whether the battery is dead, charging, or fully charged. The charging indicators 412 may be one or more lights. In an embodiment, the charging indicator 412 is disposed on the top surface of the battery pack 202. A first light of the charging indicator 412 may illuminate when the battery pack 202 is charging and a second light of the charging indicator 412 may illuminate when the battery pack 202 is fully charged. The battery pack 202 may also include a number of "in use" indicators 414. The "in use" indicators 414 may be a light (for example, an LED) located proximate to a USB port 406. In another embodiment, "in use" indicators 414 may be disposed proximate to any power output (for example, female wall sockets 408 or USBC ports 410). In an embodiment, if the USB port 406 is supplying power to a USB device, the "in use" indicator 414 may illuminate. In an embodiment, the "in use" indicator 414 and/or the charging indicator 412 may change color, light intensity, blinking pattern, or other light characteristic to inform the user of an associated status (for example, a particular port is supplying power or the battery pack 202 is being charged). In an alternate embodiment, the battery pack 202 and/or box 102 include a speaker configured to deliver audio alerts to the user.

In one embodiment, the battery pack 202 may include five USB ports 406 on the top surface, four wall power adapters 408 on the front face, two USB ports 406 on the front face, two USBC ports 410 on the front face, and one wall power input 404 on the rear face. In an embodiment, the USB ports 406 on the top surface are routed through a circuit board to ensure a consistent 5V power output.

In an embodiment, the battery packs 202 are configured to attach to one another. For example, the wall power input of one battery pack 202 may enter the wall power output of another battery pack 202. In another embodiment, the battery pack 202 includes an extension port and/or extension cable that enables more than one battery packs 202 to be linked together. In such an embodiment, electricity may flow between the one or more battery packs 202.

In an embodiment, the box 102 may include insulation. The insulation may be comprised of shredded recycled rubber. The insulation may also be comprised of traditional insulation like fiberglass or bubble insulation. The insulation may be located in the walls of the box 102. In an embodiment, the insulation may be disposed on the inside surface of the lid 116.

The battery pack 202 may also include one or more charging interfaces 402. The charging interface 402 may be configured to be in electrical communication with the charging port of the box 102. In such an embodiment, the charging interface 402 and the charging port may allow for bi-directional electrical communication (for example, the flow of electricity and/or information-carrying signals). For example, the one or more solar panels 120 may generate power and that power may be directed into the battery pack 202 via the charging port and charging interface 402.

The battery pack 202 may be charged via a number of methods. In an embodiment, the battery pack 202 may be charged by plugging the battery pack 202 into a standard wall outlet (for example, by inserting the power input 404 into a wall outlet). In an embodiment, the battery pack 202 may be charged via the one or more solar panels 120 or one or more turbines 302.

In an embodiment, power may pass through from a wall outlet to the battery pack's 202 power outputs. In such an embodiment, a user may plug the battery pack 202 into a standard wall outlet and use the power outputs on the battery pack 202 to power another device (for example, a lamp or an oscillating fan). In such an embodiment, the battery pack 202 may remain plugged into a wall outlet and the user may remove it in the event of a power outage. In doing so, the battery pack 202 may constantly remain charged.

In an embodiment, the battery pack 202 may actively charge while plugged into a wall outlet and while supplying power to another device. In another embodiment, the battery pack 202 will not charge when supplying power to another device. In an embodiment, the box computer and/or a computer or chip within the battery pack may direct the flow of electricity to the various power outputs and/or battery. The box computer and/or a computer or chip within the battery pack 120 may be configured to convert or filter power (for example, decreasing voltage or current to usable levels). In an embodiment, the box computer and/or a computer or chip within the battery pack 120 may be configured to prioritize some power outputs over others (for example, if the user is utilizing too many power outputs, power may be directed to the female wall socket 408 before the USBC 410). In an embodiment, the battery pack 120 includes a computer and/or chip disposed between the power inputs and power outputs. In such an embodiment, the computer and/or chip within the battery pack is configured to direct signals to the charging indicator 412 and "in use" indicators 414.

In an embodiment, one battery pack 202 may be in electrical communication with another battery pack 202 while in the box 102. As a non-limiting example, a user may place a charged battery pack 202 and an uncharged battery pack 202 in the box 102, enabling the charged battery pack 202 to charge the uncharged battery pack 202. In such a non-limiting example, electricity may flow from the charging port associated with the charged battery pack 202 to the charging port associated with the uncharged battery pack 202.

In an embodiment, each battery pack 202 is in electrical communication with the box computer. The box computer may be configured to dictate the flow of power throughout the unit. For example, the box computer may be configured to reroute power from the solar panels 120 to the fans if the cavity 206 temperature is excessive.

In an embodiment, the battery pack 202 includes a battery computer. The battery computer may be in communication with the battery, the "in use" indicator, or any other component of the battery pack 202. The battery computer may be configured to stop the battery from charging once the battery has reached full capacity. The battery computer may also be configured to allow the battery to charge and drain (for example, to make the lithium-ion battery hold a longer charge in the long term).

In an embodiment, the battery pack 202 includes a chip configured to ensure the output on the top surface USB ports is only 5V. However, the chip (or another chip) may be configured to ensure any of the power outputs are outputting 5V (or another pre-determined voltage).

While certain novel features of the present invention have been shown and described, it will be understood that various omissions, substitutions and changes in the forms and details of the device illustrated and in its operation can be made by those skilled in the art without departing from the spirit of the invention.

What is claimed is:

1. A power-generating apparatus comprising:
    a box having a bottom surface, a top surface, a left wall, a right wall, a rear wall, a front wall, a cavity, and a lid;
    a plurality of solar panels disposed on the box, the plurality of solar panels comprising:
        a first solar panel disposed on the top surface;
        a second solar panel disposed on the left wall;
        a third solar panel disposed on the right wall;
        a fourth solar panel disposed on the rear wall; and
        a fifth solar panel disposed on the front wall; and
    one or more battery packs removably disposed within the cavity,
        wherein the plurality of solar panels are configured to charge the one or more battery packs,
        wherein each of the one or more battery packs comprises a battery, a power input, a power output, a charging interface, and a charging indicator, and
        wherein the power input is foldable.

2. The apparatus of claim 1, further comprising a turbine configured to charge the one or more battery packs.

3. The apparatus of claim 1, wherein the box is waterproof.

4. The apparatus of claim 1, further comprising an air exhaust,
    wherein a grille traverses the air exhaust.

5. The apparatus of claim 4, further comprising one or more fans.

6. The apparatus of claim 5, further comprising a heat gauge configured to instigate the one or more fans when the cavity reaches a pre-determined temperature.

7. The apparatus of claim 1, further comprising an insulation disposed within the top surface.

8. The apparatus of claim 1, wherein the power output comprises at least one USB port, at least one USBC port, and at least one wall power adapter.

9. The apparatus of claim 1, further comprising one or more charging ports disposed within the cavity, the one or more charging ports configured to transfer power to the one or more batteries via the charging interface.

10. The apparatus of claim 1, wherein the power-generating apparatus includes a pass through state,
   wherein each of the one or more battery packs is configured to draw power from the wall socket and distribute power to the power output.

11. The apparatus of claim 1, wherein the power-generating apparatus includes a pass through state,
   wherein each of the one or more battery packs is configured to draw power from the wall socket, charge the battery, and distribute power to the power output.

12. The apparatus of claim 1, further comprising a pre-fit housing disposed within the box, the pre-fit housing having one or more indentations sized to accept a bottom surface of each of the one or more battery packs.

* * * * *